United States Patent
Busato et al.

(10) Patent No.: US 7,950,377 B2
(45) Date of Patent: May 31, 2011

(54) EGR SYSTEM AND EGR VALVE WITH INTEGRATED PRESSURE SENSOR

(75) Inventors: Murray Busato, Clinton Township, MI (US); Aaron Feiner, Oak Park, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 184 days.

(21) Appl. No.: 12/374,565

(22) PCT Filed: Aug. 2, 2007

(86) PCT No.: PCT/US2007/017212
§ 371 (c)(1),
(2), (4) Date: Jan. 21, 2009

(87) PCT Pub. No.: WO2008/016657
PCT Pub. Date: Feb. 7, 2008

(65) Prior Publication Data
US 2009/0293963 A1     Dec. 3, 2009

Related U.S. Application Data

(60) Provisional application No. 60/834,984, filed on Aug. 2, 2006.

(51) Int. Cl.
*F02B 47/08* (2006.01)
*F02B 47/00* (2006.01)
(52) U.S. Cl. .................................. 123/568.21; 701/108
(58) Field of Classification Search ............ 123/568.21, 123/568.12, 568.11; 60/605.2; 701/108
See application file for complete search history.

(56) References Cited

U.S. PATENT DOCUMENTS

| | | | |
|---|---|---|---|
| 6,470,682 B2 * | 10/2002 | Gray, Jr. ....................... | 60/605.2 |
| 2002/0100463 A1 * | 8/2002 | Jaliwala et al. ........... | 123/568.21 |
| 2002/0124553 A1 * | 9/2002 | Lucas et al. ..................... | 60/278 |

FOREIGN PATENT DOCUMENTS

| JP | 2004-162674 | 6/2004 |
|---|---|---|
| JP | 2004-301043 | 10/2004 |
| KR | 10-2003-0075307 | 9/2003 |

* cited by examiner

*Primary Examiner* — Mahmoud Gimie
(74) *Attorney, Agent, or Firm* — Warn Partners, P.C.

(57) ABSTRACT

A valve having a valve body with an inlet port and an outlet port and a valve disposed between the inlet port and outlet port. A sensor is operably associated with the valve and the valve body, and measures a characteristic in proximity to the valve. The sensor communicates information regarding said characteristic to a control unit that sends position commands to said valve.

30 Claims, 2 Drawing Sheets

ND EGR VALVE WITH
EGR SYSTEM AND EGR VALVE WITH INTEGRATED PRESSURE SENSOR

CROSS-REFERENCE TO RELATED APPLICATIONS

This application claims the benefit of U.S. Provisional Application No. 60/834,984, filed Aug. 2, 2006.

FIELD OF THE INVENTION

The present invention relates to a valve having an integrated sensor.

BACKGROUND OF THE INVENTION

Valves having position sensors often have a set of predetermined valve positions that correlate to predetermined engine operating conditions. These predetermined conditions do not compensate for changes in operating conditions that are not part of the control unit's program. For example, as the components of the valve wear, contamination begins to build up inside the valve causing the flow of gas through the valve to be affected. The control unit has no way of adjusting operations in response. Therefore, there exists a need to compensate for changes in gas flow and adjust the position of the valve.

SUMMARY OF THE INVENTION

The present invention is a valve having a valve body with an inlet port and an outlet port and a valve disposed between the inlet port and outlet port. A sensor is operably associated with the valve and the valve body and measures a characteristic in proximity to the valve. The sensor communicates information regarding the characteristic to a control unit that sends position commands to the valve.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
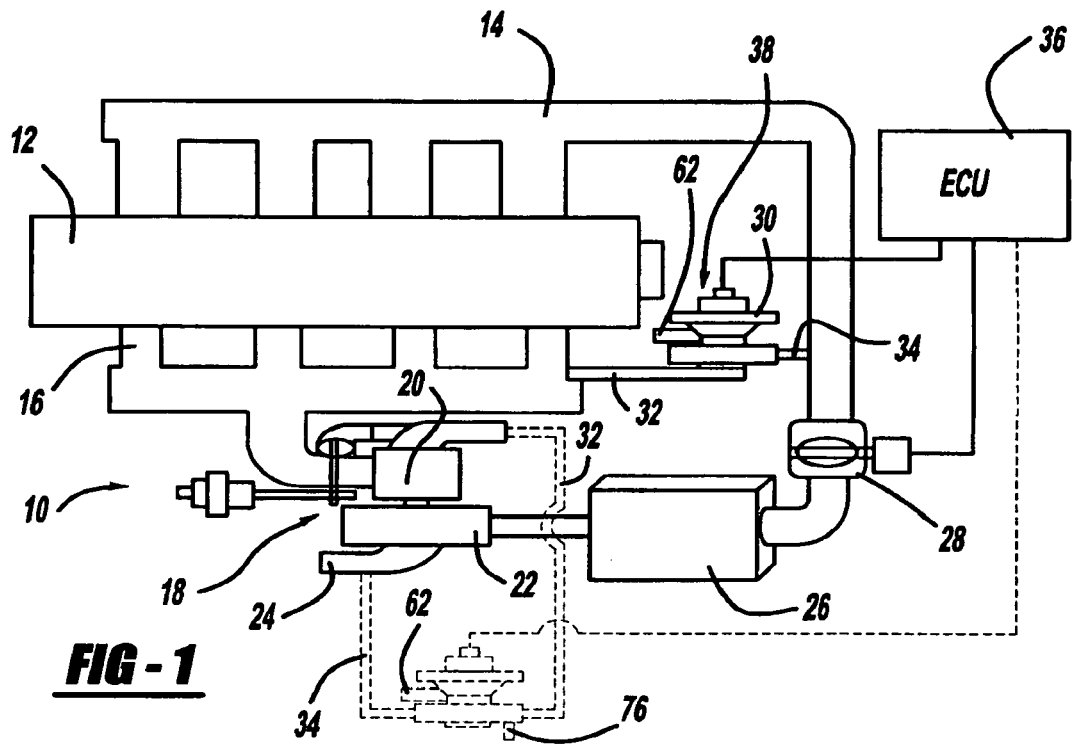
FIG. 1 a schematic of an engine intake and exhaust system incorporating an exhaust gas return valve, according to the present invention.

An exhaust gas recirculation (EGR) system is shown in FIG. 1 generally at 10. The system 10 includes an engine 12 which has an intake manifold 14 and an exhaust manifold 16. The exhaust manifold 16 feeds exhaust gas from the engine 12 into a turbocharger unit 18. The turbocharger unit 18 has a turbine 20, and a compressor 22. The compressor 22 includes an inlet pipe 24 for receiving air from the atmosphere and feeding it into an intercooler 26. The intercooler 26 is connected to a throttle valve 28, the throttle valve 28 is used for controlling the flow of air into the intake manifold 14.

The system 10 also includes an EGR valve 30 for controlling the flow of exhaust gas from the exhaust manifold 16 to the intake manifold 14. There is a first conduit 32 which is connected between the exhaust manifold 14 and the EGR valve 30, and a second conduit 34 connected between the EGR valve 30 and the intake manifold 14. Both the throttle valve 28 and the EGR valve 30 are controlled by an electronic control unit (ECU) 36.

Referring now to all of the figures, a cross sectional view of the EGR valve 30 is shown. The EGR valve 30 is actuated by an actuator 38. The actuator 38 in this embodiment is a solenoid. The EGR valve 30 has a valve body 40 with an inlet port 42 and an outlet port 44. Located between the inlet port 42 and the outlet port 44 is a valve 50 having a valve stem 52, and a valve member 54. The valve member 54 rests against the valve seat 56 when the valve 50 is in the closed position. The inlet port 42 is in fluid connection with the first conduit 32, and the outlet port 44 is in fluid connection with the second conduit 34.

Also included in the valve body 40 is a first passage 46 and a second passage 48; the valve seat 56 has a first side 58 and a second side 60. The first passage 46 is connected to the second side 60 of the valve seat 56 and the second passage 48 is connected to the first side 58 of the valve seat 56. The first passage 46 and second passage 48 are operably connected to the flow path through the valve body. A sensor 62, which in this embodiment is a pressure sensor, is integrated into the valve body 40, and is located in the first passage 46 and the second passage 48. The placement of the sensor 62 in the first passage 46 and second passage 48 allow the sensor 62 to take pressure readings on both sides of the valve 50. Furthermore, the sensor 62 can take readings with minimal intrusion into the flow path of the valve 50.

The valve stem 52 is connected to the solenoid 38 which acts on the valve stem 52 to move the valve member 54 between the open and closed position, or any other desired position therebetween, with respect to the valve seat 56. The amount of space created by the valve member 54 and the valve seat 56 when the valve member 54 is displaced from the valve seat 56 is referred to as an effective orifice 64. The effective orifice 64 is the amount of area available for the exhaust gas to flow through when it is flowing between the valve member 54 and the valve seat 56. This effective orifice 64 creates a restriction of exhaust gas flow, and a pressure drop across the valve member 54 and the valve seat 56. The size of the effective orifice 64 will vary, depending upon the position of the valve member 54 in relation to the valve seat 56. The size of the effective orifice 64 can range from zero, when the valve 50 is closed, to a size equal to or greater than the size of the valve seat 56, when the valve is fully open.

The actuator 38 also includes a position sensor 66 which provides a signal to the ECU 36 indicating the position of the valve member 54. This allows the ECU 36 to compare the position of the valve 50 and the pressure across the valve 50 simultaneously. It is not required that a position sensor 66 be used in order to determine the appropriate position of the valve 50. Rather the data collected by the sensor 62 can be enough for the ECU 36 to make a determination of how the valve 50 needs to be adjusted.

Figure 2:
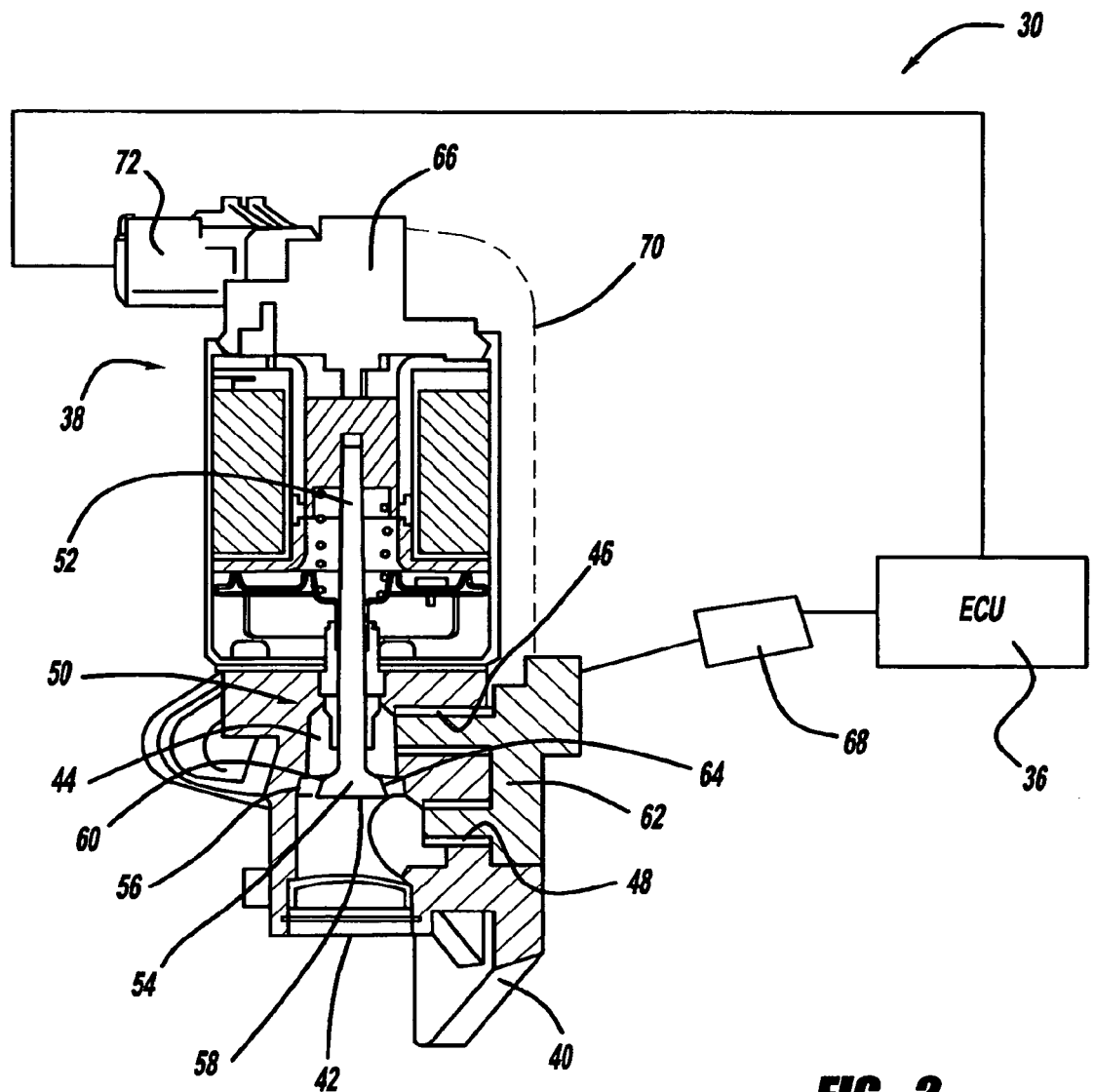
FIG. 2 is a sectional side view of a system with an EGR valve having a solenoid as an actuator, according to the present invention.

The embodiment shown in FIG. 2 also shows a wiring harness 68 which is used to connect the sensor 62 to the ECU 36. However, the embodiment in FIG. 2 includes the concept of having the sensor 62 having an alternate connection 70, which would allow the sensor 62 to be included in the connector 72. Having the single connector 72 for both the solenoid 38 and the sensor 62 simplifies the invention even further.

The actuator 38 shown in the present embodiment of the invention is a solenoid. It is within the scope of this invention for virtually any other type of actuator to be used that will cause the desired controlled movement of the valve 50 in response to the signal from the sensor 62, and if applicable, the position sensor 66. Examples of other types of actuators 38 include, but are not limited to, D.C. motors, stepper motors, pneumatic actuators, hydraulic actuators or combinations thereof. The type of control signal generated by the ECU 36 to the actuator will depend on the type of actuator being used. For example, the control signal can be a stepped electrical pulse, an amplitude modulated signal, a pulse width modulated signal, or other electronic signals.

When the system 10 and valve 50 shown in FIGS. 1-2 are operated, fresh air is fed into the intake pipe 24 and is compressed by the compressor 22, and fed into the intercooler 26. The air is then cooled by the intercooler 26, and flows through the throttle valve 28, through the intake manifold 14, and into the engine 12. The amount of air which flows into the intake manifold 14 is controlled by the throttle valve 28.

The compressor 22 is powered by the turbine 20. Once the fresh air is received by the engine 12 is combined with fuel, compressed, combusted and converted to exhaust gas. The turbine 20 receives the exhaust gas from the exhaust manifold 16, and the energy from the exhaust gas is used to power the turbine 20. That power is transferred to the compressor 22, where the compressor compresses fresh air.

A portion of the exhaust gas does not flow to the turbine 20. Some of the exhaust gas is recirculated back into the intake manifold and is fed into the engine 12. This portion of exhaust gas will flow from the exhaust manifold 16 into the first conduit 32 and into the EGR valve 30. Once the gas flows through the EGR valve 30, it will flow into the second conduit 34, and into the intake manifold 14.

The EGR valve 30 controls the amount of exhaust gas that is recirculated from the exhaust manifold 16 to the intake manifold 14. The EGR valve 30 and the throttle valve 28 are both controlled by the vehicle's ECU 36. The ECU 36 controls the amount of fresh air going into the intake manifold 14 through the use of the throttle valve 28, and also controls the amount of exhaust gas which is recirculated through the use of the EGR valve 30. The sensor 62 measures a characteristic in proximity to the valve 50 relative to the valve position and flow. The sensor 62 as shown in FIG. 2 is a pressure, sensor that measures pressure at the first side 58 and second side 60 of the valve 50. The sensor 62 then transmits a signal to the ECU 36. Using the information from the signal the ECU 36 determines whether the valve 50 needs to change position or be maintained. The desired position of the valve 50 is achieved by the ECU 36 adjusting the control signal to the actuator 38.

It should be noted that the characteristic measured is not necessarily limited to pressure; the characteristic could also be mass flow rate, volumetric flow rate, temperature, air particulate content, contamination, density, or any other type of characteristic which can be used to provide an indication of gas flow. The sensor 62 could be any type of sensor used to measure the specific characteristics listed above on the first side 58 and the second side 60 of the valve seat 56.

The pressure drop can be used to calculate the amount of exhaust gas flowing through the effective orifice 64. The sensor 62 will then provide a signal to the ECU 36; the ECU 36 will then determine if the valve 50 position and control signal must change to achieve the desired exhaust gas flow through EGR valve 30. In this embodiment, ECU 36 is programmed with a map of engine 12 operating conditions, or a set of predetermined operating conditions for the valve 50, and a desired exhaust gas flow for each condition. There is an associated EGR valve 30 control signal and sensor 62 signal for each level of exhaust gas flow. The ECU 36 will receive the pressure inputs from the sensor 62 and the position sensor 66, and determine the control signal required to achieve the desired position of valve 50 in EGR valve 30, and provide the required amount of exhaust gas flow. The ECU 36 will adjust the position of the valve 50 to achieve or maintain the proper amount of exhaust gas flow through the EGR valve 30.

Figure 3:
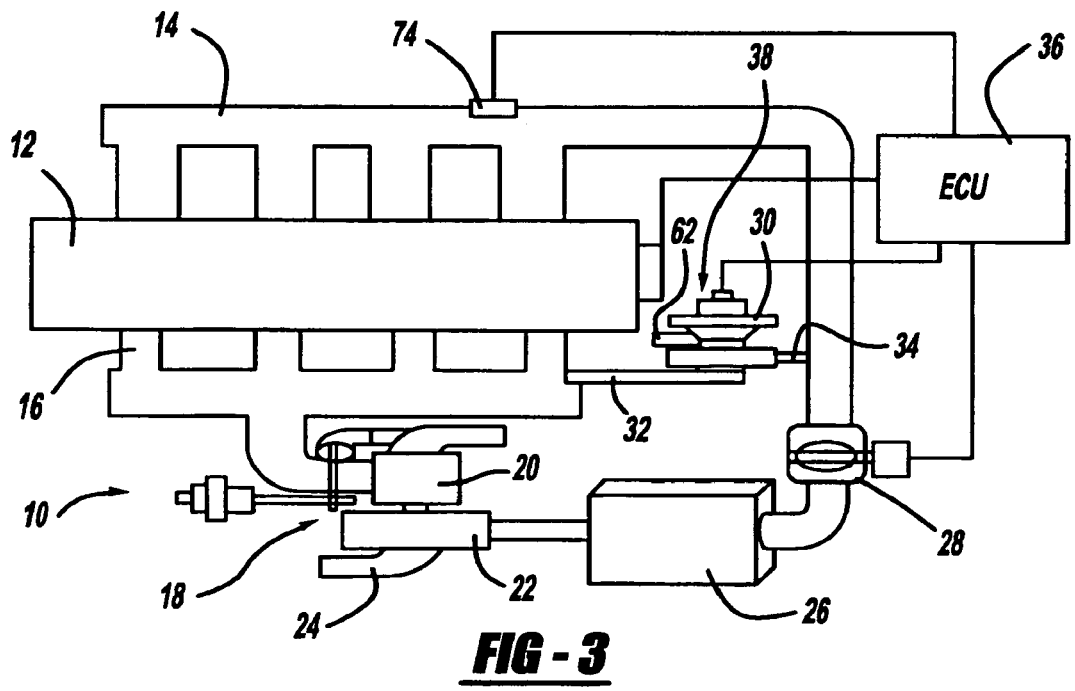
FIG. 3 is an exhaust gas return system having a pressure sensor incorporated into the EGR valve, and a pressure sensor located in the intake manifold, according to the present invention.

Another embodiment of the present invention is shown in FIG. 3 which includes a separate sensor 74 used to determine the exhaust gas pressure in the intake manifold 14 and ascend side 60 of valve seat 56. The sensor 62 will then determine the level of pressure on the first side 58 of the valve seat 56. The pressure measurement taken by the sensor 62 and the separate sensor 74 can also provide an indication of pressure differential, and therefore determine the amount of exhaust gas flow.

Another embodiment of the present invention is shown in phantom in FIG. 1. In this embodiment, the first conduit 32 is connected to the turbine 20, instead of the exhaust manifold 16, and the second conduit 34 is connected to the inlet pipe 24 of the compressor 22. In this mode of operation, the EGR valve 30 is a "low-pressure" valve, because it is located downstream from the turbine 20, and upstream from the compressor 22. After the exhaust gas flows through the turbine 20, the exhaust gas will flow through the first conduit 32, and if the EGR valve 30 is open, the exhaust gas will flow through the EGR valve 30, through the second conduit 34, and into the inlet pipe 24. If the EGR valve 30 is closed, the exhaust gas in the first conduit 32 will flow out of an outlet pipe 76.

The present invention has the advantage of measuring exhaust gas flow and adjusting the size of the effective orifice 64 accordingly to ensure the exhaust gas flow is correct for each of the engine operating conditions. This presents a significant advantage over EGR systems which use a set of predetermined valve positions for each engine operating parameter which do not take into account contamination, wear, assembly tolerances, and other external factors which can affect the flow of exhaust gas through the valve 50. These types of EGR valves infer flow from the position of the valve. The present invention has the distinct advantage of taking an actual measurement of gas pressure, and adjusting the flow of the gas to compensate for contamination, wear, assembly tolerances, and other factors affecting the flow of the gas. Essentially, the ECU 36 is using feedback from the sensor 62 and position sensor 66 to ensure there is optimal exhaust gas flow for each engine operating condition.

It should be noted that the position sensor 66 can be eliminated if necessary to suit a specific application. The sensor 62 can be used to provide feedback to the ECU 36, and the ECU 36 will adjust the position of the valve 50 until the proper amount of exhaust gas flow is achieved. The actuator could also be a hydraulic actuator (not shown) where hydraulic pressure would be used to actuate the valve 50.

In addition to the sensor 62 being physically integrated into the EGR valve 30, the sensor 62 can also be electrically integrated in that there can be a single electrical connector which can be used for both the EGR valve 30 and the sensor 62.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A valve, comprising:
   a valve body having an inlet port, and an outlet port;
   a valve disposed between said inlet port, and said outlet port, said valve having a valve seat first side and a valve seat second side;
   a sensor operably associated with said first side and second side of valve at said valve body;
   a control unit for controlling said valve;
   said valve body including a first passage connected to said valve seat first side of said valve, said sensor partially extending into said first passage;
   said valve body including a second passage connected to said valve seat second side of said valve, said sensor partially extending into said second passage; and
   wherein said sensor measures a characteristic in proximity to said valve such that said sensor measures said characteristic in said first passage, and said characteristic in said second passage, and said sensor communicates information regarding said characteristic to said control unit, and said control unit sends position commands to said valve for compensating for changes in operating conditions of said valve.

2. The valve of claim 1, further comprising an actuator for changing the position of said valve.

3. The valve of claim 2, wherein said actuator is one selected from the group comprising a D.C. motor, a solenoid, a stepper motor, a pneumatic actuator, or a hydraulic actuator.

4. The valve of claim 1, wherein said control unit commands said valve to change position through the use of a control signal, said control signal is one selected from a group comprising a stepped electrical pulse, a pulse width modulated signal, or an amplitude modulated signal.

5. The valve of claim 1, wherein said control unit will verify the position of said valve to maintain the amount of said characteristic in proximity to said valve.

6. The valve of claim 1, wherein when said sensor determines a fluctuation in said characteristic in proximity to said valve, said control unit adjusts said valve so a desired constant amount of said characteristic is maintained.

7. The valve of claim 1, further comprising an effective orifice, created by the position of said valve used for delivering a gas from said inlet port, to said outlet port.

8. The valve of claim 1, wherein and said valve further comprises a valve seat and a valve member.

9. The valve of claim 1, wherein said sensor communicates information regarding said characteristic on said first side of said valve and said second side of said valve to said control unit, and said control unit sends position commands to said valve.

10. The valve of claim 1 further comprising a first passage extending through said valve body to said first side of said valve, a second passage extending through said valve body to said second side of said valve, wherein the pressure in said first passage is sensed by said sensor, and the pressure in said second passage is sensed by said sensor.

11. The valve of claim 1, further comprising a position sensor for providing the position of said valve to said control unit.

12. The valve of claim 11, wherein said control unit adjusts the position of said valve based on the communication of the amount of said characteristic determined by said sensor and the communication of the position of said valve from said position sensor.

13. The valve of claim 1, wherein said characteristic is one selected from the group comprising pressure, mass flow rate, volumetric flow rate, temperature, air particulate content, contamination, or density.

14. The valve of claim 1, further comprising:
   a turbocharger having a turbine and a compressor, said turbine operably associated with said compressor, wherein said inlet port is in fluid communication with said turbine, and said outlet port is selectively in fluid communication with said compressor.

15. The valve of claim 14, further comprising said inlet port receiving exhaust gas at a location upstream of said turbine, and said outlet port distributing exhaust gas downstream of said compressor.

16. The valve of claim 14, further comprising said inlet port receiving exhaust gas at a location downstream of said turbine, and said outlet port distributing exhaust gas upstream of said turbine.

17. An exhaust gas recirculation system having a valve, comprising:
   a valve body having an inlet port and an outlet port;
   a valve positioned in said valve body, operably associated with a valve seat;
   an effective orifice created by said valve and said valve seat for forming a passageway for facilitating the flow of gas;
   said valve body including a first passage formed as part of said valve body, said first passage connected to a valve seat first side of said valve;
   said valve body including a second passage formed as part of said valve body, said second passage connected to a valve seat second side of said valve;
   a pressure sensor partially disposed in said first passage and partially disposed in said second passage, said pressure sensor operable for taking at least one measurement of gas flow pressure associated with said valve seat first side of said valve, wherein said pressure sensor transmits a signal;
   an actuator for positioning said valve in relation to said valve seat;
   a second sensor downstream of said valve for taking a measurement of exhaust gas flow pressure associated with said valve seat second side of said valve; and
   a control unit for controlling said actuator and said valve, said control unit receives said signal from said pressure sensor, and sends a control signal to said actuator, wherein said control signal commands said actuator to change the position of said valve in response to said signal from said first sensor and said second sensor for compensating in changes in the operating conditions of said valve, or said control signal commands said actuator to maintain the position of said valve.

18. The valve of claim 17, wherein said actuator is one selected from the group comprising a D.C. motor, a stepper motor, a solenoid, a pneumatic actuator, and a hydraulic actuator.

19. The valve of claim 17, wherein and said valve is further comprised of a valve stem and a valve member.

20. The valve of claim 17, wherein said control unit further includes a set of operating conditions, and said control unit commands said actuator to adjust the position of said valve such that proper exhaust gas flow is achieved for each of said operating conditions.

21. The valve of claim 17, wherein said control signal is one selected from the group comprising a stepped electrical pulse, a pulse width modulated signal, or an amplitude modulated signal.

22. The valve of claim 17, further comprising a turbocharger unit having a turbine and a compressor, said inlet port in fluid communication with said turbocharger, and said outlet port is selectively in fluid communication with said compressor.

23. The valve of claim 22, wherein said inlet port is in fluid communication with said turbine upstream of said turbine, and said outlet port is selectively in fluid communication with said compressor downstream of said compressor.

24. The valve of claim 22, wherein said inlet port in is fluid communication with said turbine downstream of said turbine, and said outlet port is selectively in fluid communication with said compressor upstream of said compressor.

25. A method for controlling the flow of gas through a valve, comprising the steps of:
providing a valve body having an inlet port, and an outlet port;
providing a first passage integrally formed as part of said valve body;
providing a second passage integrally formed as part of said valve body;
providing a valve operably associated with a valve seat, said valve and valve seat disposed between said inlet port and said outlet port, said valve having a valve seat first side connected with said first passage, and said valve having a valve seat second side connected with said second passage;
providing an actuator for positioning said valve;
providing a pressure sensor for providing a first gas pressure measurement in proximity to said valve seat first side of said valve, providing a pressure sensor for providing a second gas pressure measurement in proximity to said valve seat second side of said valve;
providing a control unit for receiving said at least one gas pressure measurements, and controlling said actuator;
partially disposing said valve in said first passage;
partially disposing said valve in said second passage;
creating an effective orifice with said valve seat and said valve;
monitoring the gas pressures in proximity of said valve;
sending a signal to said control unit; and
sending a control signal from said control unit to said actuator to change the position of said valve based on said gas pressure for compensating for changes in operating conditions of said valve.

26. The method of claim 25, further comprising the steps of:
providing said valve with a valve stem and a valve member; and
changing the position of said valve stem and said valve member by activating said actuator and moving said valve member with respect to said valve seat.

27. The method of claim 25, further comprising the steps of:
providing a position sensor operably associated with said valve;
sending said data signal from said pressure sensor to said control unit;
sending a position signal from said position sensor to said control unit;
sending said control signal from said control unit to said actuator; and
changing the position of said valve based on said data signal received from said pressure sensor, and said position signal received from said position sensor.

28. The method of claim 25, further comprising the steps of:
providing a turbocharger unit having a turbine and a compressor;
placing said inlet port in fluid communication with said turbine; and
placing said outlet port selectively in fluid communication with said compressor.

29. The method of claim 28, further comprising the steps of:
placing said inlet port in fluid communication with said turbine at a location upstream of said turbine; and
placing said outlet port selectively in fluid communication with said compressor at a location downstream of said compressor.

30. The method of claim 28, further comprising the steps of:
placing said inlet port in fluid communication with said turbine at a location downstream of said turbine; and
placing said outlet port selectively in fluid communication with said compressor at a location upstream of said compressor.

* * * * *